United States Patent
Yang et al.

(10) Patent No.: US 10,281,977 B2
(45) Date of Patent: May 7, 2019

(54) VIRTUAL REALITY SYSTEMS WITH HUMAN INTERFACE DEVICE EMULATION AND RELATED METHODS

(71) Applicant: Acer Incorporated, New Taipei (TW)

(72) Inventors: Chao-Kuang Yang, New Taipei (TW); Tzu-Lung Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 198 days.

(21) Appl. No.: 15/604,831

(22) Filed: May 25, 2017

(65) Prior Publication Data

US 2018/0341326 A1 Nov. 29, 2018

(51) Int. Cl.
G06F 3/01 (2006.01)
G06T 19/20 (2011.01)
G06T 3/20 (2006.01)
G06F 3/038 (2013.01)
G06F 3/0484 (2013.01)
G06F 3/0346 (2013.01)

(52) U.S. Cl.
CPC .............. *G06F 3/012* (2013.01); *G06F 3/011* (2013.01); *G06F 3/017* (2013.01); *G06F 3/038* (2013.01); *G06F 3/0346* (2013.01); *G06F 3/04845* (2013.01)

(58) Field of Classification Search
CPC .......... G06F 3/012; G06F 3/011; G06F 3/017; G06F 3/038; G06F 3/04845; G06F 3/0346; G06T 19/20; G06T 2219/2016; G06T 3/20

See application file for complete search history.

(56) References Cited

U.S. PATENT DOCUMENTS 6,184,847 B1 * 2/2001 Fateh ..................... G06F 3/011
  345/8
9,630,098 B2   4/2017 Mikhailov et al.
(Continued)

FOREIGN PATENT DOCUMENTS

CN    101620474 A   1/2010
TW    201511803 A   4/2015
TW    M532594 U    11/2016

OTHER PUBLICATIONS

TW Office Action dated Feb. 21, 2018 in Taiwan application (No. 106115718).

*Primary Examiner* — Hong Zhou
(74) *Attorney, Agent, or Firm* — McClure, Qualey & Rodack, LLP

(57) ABSTRACT

Virtual reality (VR) systems with human interface device (HID) emulation and related methods are provided. A representative VR system includes: a VR head mounted display having a head piece and a display, the head piece being configured to be worn by a user to position the display, the display being configured to display the 3D content to the user, the head mounted display being configured to provide movement information corresponding to movement of the head mounted display; and emulation circuitry configured to: receive the movement information; convert the movement information into emulated HID movement information compatible with the 3D content; and use the emulated HID movement information to facilitate interaction of the user within a VR environment, associated with the 3D content, displayed on the display of the head mounted display.

19 Claims, 6 Drawing Sheets

(56) References Cited

U.S. PATENT DOCUMENTS

| | | | |
|---|---|---|---|
| 2006/0012571 A1* | 1/2006 | Rodgers | G06F 3/012 345/157 |
| 2007/0070072 A1* | 3/2007 | Templeman | A63F 13/00 345/473 |
| 2008/0211768 A1* | 9/2008 | Breen | G06F 3/012 345/157 |
| 2013/0083976 A1* | 4/2013 | Ragland | G06F 3/011 382/117 |
| 2015/0138074 A1* | 5/2015 | Hennelly | G06F 3/017 345/156 |
| 2016/0249124 A1 | 8/2016 | Drinkwater et al. | |
| 2016/0267716 A1* | 9/2016 | Patel | G09G 5/395 |
| 2017/0092235 A1* | 3/2017 | Osman | G06F 3/012 |
| 2017/0315721 A1* | 11/2017 | Merel | G06F 3/04815 |
| 2018/0046431 A1* | 2/2018 | Thagadur Shivappa | H04S 7/304 |

* cited by examiner

VIRTUAL REALITY SYSTEMS WITH HUMAN INTERFACE DEVICE EMULATION AND RELATED METHODS

BACKGROUND

Technical Field

The disclosure relates to the presentation of virtual reality content to a user.

Description of the Related Art

Virtual reality (VR) is the concept involved with the immersion of a user in a computer-generated three dimensional (3D) environment by simulating the user's presence in the environment in a manner that permits user interaction. Recent commercial trends in VR technology employ the use of head mounted displays (HMDs) that provide the wearer with stereoscopic images portraying the VR environment. In order to facilitate user interaction, tracking systems are provided for determining one or more of the movement of a user's head ("head tracking") and position of a user and/or of an accessory ("motion tracking"). Typically, tracking systems are provided from among two types, "inside-out" and "outside-in".

For an "inside-out" tracking system, one or more sensors (e.g., gyroscopes, accelerometers and/or magnetometers) are implemented onboard (i.e., moveable with) the HMD to perform head tracking. Notably, head tracking may involve determining movement with respect to one or more of multiple axes, including forward and backward movement about an x-axis (pitch), shoulder-to-shoulder movement about a z-axis (roll), and side-to-side movement about a y-axis (yaw). In contrast, an "outside-in" tracking system uses sensors external to the HMD to determine head tracking. By way of example, an outside-in tracking system may use sensors (e.g., cameras) that are mounted within a room in order to determine movements of the HMD within that room. In such a system, the HMD may serve as a sensor hub for receiving movement information from the room-mounted sensors, with the movement information then being provided to an attached computing device (e.g., a PC) for performing movement computations. Outside-in systems also may be used for position tracking of objects other than an HMD, such as an accessory (e.g., a controller) used to simulate an object in the VR environment thus permitting interaction by a user with the accessory/object in both the physical and VR environments. It should also be noted that some outside-in systems employ one or more onboard sensors. Thus, designation of an HMD as inside-out or outside-in typically is based on the presence (or not) of an HMD configuration for interacting with external sensors.

Prior to the advent of VR HMDs, human interface devices (HIDs) (e.g., a mouse and a keyboard) typically were used for interacting with computer-generated 3D environments provided by 3D content. Unfortunately, even though a vast amount of interactive 3D content (e.g., 3D content coded using the OPENGL® 3D and MICROSOFT® DIRECT3D® developer platforms) exists, being configured for use with HIDs tends to render that 3D content incompatible for use with HMDs.

It is desired to provide a more robust VR system.

SUMMARY

Virtual reality (VR) systems with human interface device (HID) emulation and related methods are provided. In this regard, an example embodiment of VR system for displaying three-dimensional (3D) content to a user, the 3D content being configured to respond to inputs provided by an HID, comprises: a VR head mounted display having a head piece and a display, the head piece being configured to be worn by a user to position the display, the display being configured to display the 3D content to the user, the head mounted display being configured to provide movement information corresponding to movement of the head mounted display; and emulation circuitry configured to: receive the movement information; convert the movement information into emulated HID movement information compatible with the 3D content; and use the emulated HID movement information to facilitate interaction of the user within a VR environment, associated with the 3D content, displayed on the display of the head mounted display.

Another example embodiment of a VR system for displaying 3D content to a user, the 3D content being configured to respond to inputs provided by a human interface device (HID), including HID pitch inputs and HID yaw inputs, but not configured to respond to HID roll inputs, comprises: a VR head mounted display (HMD) configured to provide movement information corresponding to movement of the HMD, the movement information including HMD pitch information corresponding to pitch of the HMD, HMD yaw information corresponding to yaw of the HMD, and HMD roll information corresponding to roll of the HMD; and emulation circuitry configured to: receive the movement information; convert the movement information into emulated HID movement information compatible with the 3D content such that the HMD pitch information and the HMD yaw information are converted to emulated HID pitch inputs and emulated HID yaw inputs, respectively; use the emulated HID movement information to facilitate interaction of the user within a VR environment, associated with the 3D content, displayed by the HMD such that the VR environment responds to the emulated HID pitch inputs and the emulated HID yaw inputs; and reconfigure image data associated with the 3D content such that the VR environment responds to the HMD roll information.

An example embodiment of a method for displaying 3D content to a user, the 3D content being configured to respond to inputs provided by a human interface device (HID), comprises: receiving movement information corresponding to movement of a VR head mounted display; converting the movement information into emulated HID movement information compatible with the 3D content; and using the emulated HID movement information to facilitate interaction of the user within a VR environment, associated with the 3D content, displayed by the head mounted display.

Another example embodiment of a method for displaying 3D content to a user, the 3D content being configured to respond to inputs provided by a human interface device (HID), including HID pitch inputs and HID yaw inputs, but not configured to respond to HID roll inputs, comprises: receiving movement information corresponding to movement of a VR head mounted display (HMD), the movement information including HMD pitch information corresponding to pitch of the HMD, HMD yaw information corresponding to yaw of the HMD, and HMD roll information corresponding to roll of the HMD; converting the HMD pitch information and the HMD yaw information into emulated HID pitch inputs and emulated HID yaw inputs, respectively; using the emulated HID pitch inputs and emulated HID yaw inputs to facilitate interaction of the user within a VR environment, associated with the 3D content, displayed by the HMD such that the VR environment responds to the emulated HID pitch inputs and the emulated HID yaw inputs; and reconfiguring image data associated with the 3D content such that the VR environment responds to the HMD roll information.

Other features and/or advantages will become apparent from the following detailed description of the preferred but non-limiting embodiments. The following description is made with reference to the accompanying drawings.

DETAILED DESCRIPTION

Figure 1:
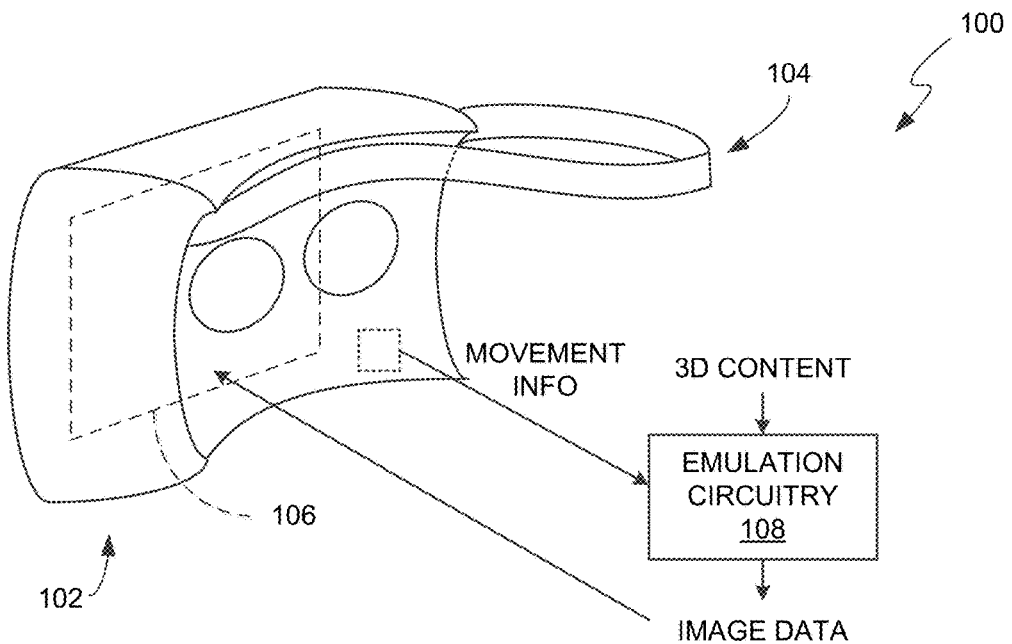
FIG. 1 is a schematic diagram of an example embodiment of a virtual reality (VR) system.

Having summarized various aspects of the present disclosure, reference will now be made in detail to that which is illustrated in the drawings. While the disclosure will be described in connection with these drawings, there is no intent to limit the scope of legal protection to the embodiments disclosed herein. Rather, the intent is to cover all alternatives, modifications and equivalents included within the scope of the disclosure as defined by the appended claims.

In this regard, virtual reality (VR) systems with human interface device (HID) emulation and related methods are provided that, in some embodiments, enable the use of 3D content (e.g., legacy 3D content) configured exclusively for use with HIDs to be used with VR head mounted displays (HMDs). In some embodiments, movement information for interacting with the 3D content may be selectively switched between movement information provided by one or more associated HIDs (e.g., a keyboard) and movement information provided by an HMD. So configured, a user who has previously been limited to interacting with 3D content using HIDs may (either additionally or alternatively) experience the 3D content using an HMD.

An example embodiment of a VR system is depicted schematically in FIG. 1. As shown in FIG. 1, VR system 100 incorporates an HMD 102 that includes a head piece 104 and a display 106 (e.g., a stereoscopic display that incorporates two separate display components). Head piece 104 is configured to be worn by a user to position the display in front of the user's eyes. Display 106 is configured to display images to the user wearing head piece 104 so that the user can view a VR environment based on image data associated with the provided 3D content.

VR system 100 also incorporates emulation circuitry 108 that is configured to receive movement information. In some embodiments, such as when the HMD is an inside-out HMD, the movement information may correspond to sensed movements of the HMD associated with one or more onboard sensors (e.g., gyroscopes, accelerometers and/or magnetometers) that are movable with the HMD (not shown in FIG. 1). In other embodiments, such as when the HMD is an outside-in HMD, the movement information may correspond to HMD and/or accessory movements, as detected by one or more external sensors (also not shown in FIG. 1).

Emulation circuitry 108, which may be carried by the HMD (e.g., mounted to the HMD) and/or resident on an associated computing device (e.g., a PC), converts the movement information into emulated HID movement information. Typically, the emulated HID movement information includes track information corresponding to movement direction of the user within the VR environment and viewing information corresponding to the orientation or viewing direction of the user within the VR environment. Of significance, the emulated HID movement information is compatible with 3D content that is configured for use with inputs from one or more HIDs. As such, a user is able to interact within a VR environment associated with the 3D content using HMD 102 even though the 3D content was created for use with HIDs (i.e., not created for use with HMD inputs).

Figure 2:
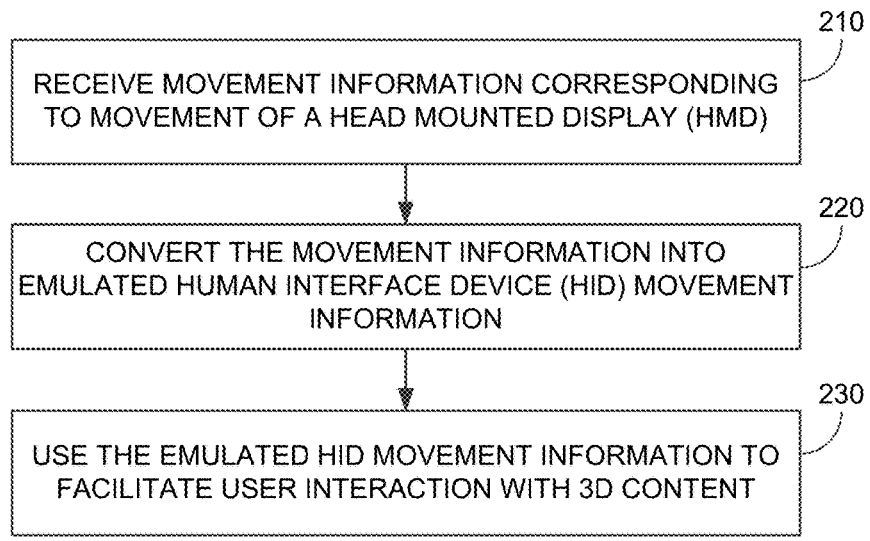
FIG. 2 is a flowchart of an example embodiment of a method that may be associated with a VR system.

FIG. 2 is a flowchart depicting an embodiment of a method (functionality) that may be associated with a VR system such as VR system 100 of FIG. 1, for example. As shown in FIG. 2, the method (or process) 200, which involves the display of 3D content configured to respond to HID inputs, may be construed as beginning at block 210, in which movement information corresponding to movement of a VR head mounted display is received. In some embodiments, the movement information may correspond to sensed movements of the HMD associated with one or more onboard sensors whereas, in other embodiments, the movement information may correspond to movements detected by one or more external sensors. In block 220, the movement information is converted into emulated HID movement information compatible with the 3D content. In some embodiments, less than all of the movement information may be converted into emulated HID movement information. By way of example, some 3D content may not recognize (or have use for) movement information corresponding to one or more types of movement (e.g., roll), in which case the portion of the movement information associated with that type of movement may be disregarded (unused) in some embodiments. In other embodiments, the portion of the movement information may be used, such as for post processing.

As depicted in block 230, the emulated HID movement information then is used to facilitate interaction of the user within a VR environment associated with the 3D content that is displayed by the HMD. In some embodiments, the emulated HID movement information is selectively provided to facilitate interaction of the user when the user is operating an associated HMD; however, HID movement information provided by one or more HIDs may otherwise be provided for facilitating user interaction with the same 3D content. Thus, switching between HMD-enabled and HID-enabled interaction may be provided. It should be noted that the aforementioned functions can be performed by one or more of various components in various embodiments.

Figure 3:
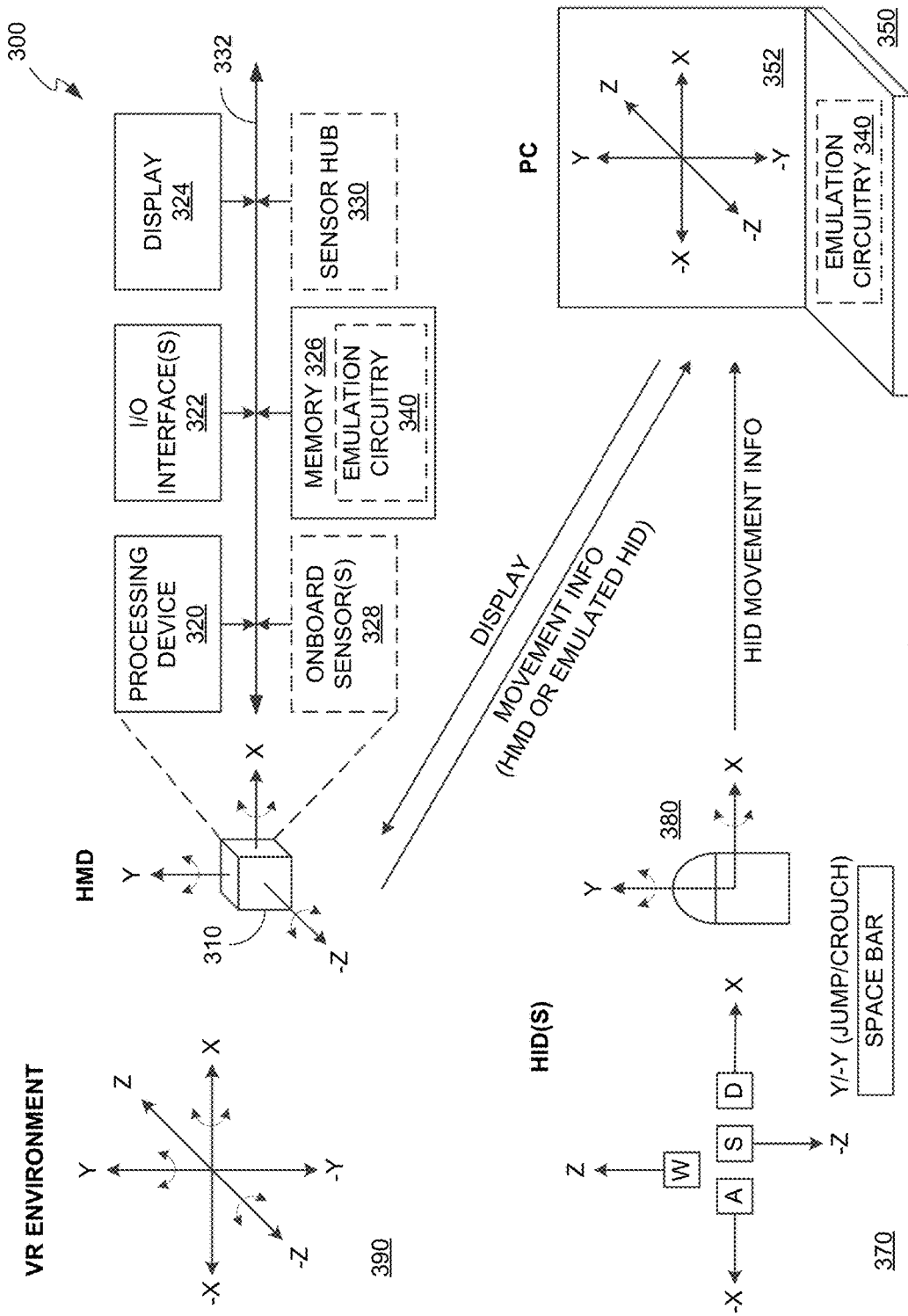
FIG. 3 is a schematic diagram of another example embodiment of a VR system.

Another example embodiment of a VR system is depicted schematically in FIG. 3. As shown in FIG. 3, VR system 300 includes an HMD 310, a PC 350 with a display 352, and HIDs 370 (a keyboard) and 380 (a mouse). HMD 310 incorporates a processing device 320 (processing circuitry), input/output (I/O) interface(s) 322, a display 324, a memory 326, and optionally one or more onboard sensors 328 and/or a sensor hub 330, with each communicating across a local data bus 332. Additionally, memory 326 may incorporate emulation circuitry 340, which includes executable instructions for particularly configuring processing device 320 in order to perform functionality associated with the providing of emulated HID movement information. In some embodiments, such as when HMD 310 is configured as an inside-out HMD, emulation circuitry 340 is configured to receive inputs from the onboard sensor(s) that are processed to provide emulated HID movement information for interacting with 3D content. In other embodiments, such as when HMD 310 is configured as an outside-in HMD, emulation circuitry 340 is configured to receive inputs from the sensor hub that are processed to provide emulated HID movement information. Notably, in some embodiments, movement information from a sensor hub may require additional processing, such as may be provided by PC 350.

The processing device 320 may include a custom made or commercially available processor, a central processing unit (CPU) or an auxiliary processor among several processors associated with HMD 310, a microprocessor, a semiconductor-based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The I/O interface(s) 322 may facilitate communication with one or more devices, such as PC 350, which may be used to provide 3D content to HMD 310 for displaying a VR environment 390 to a user.

The memory 326 can include any one or a combination of volatile memory elements (e.g., random-access memory (RAM, such as DRAM, and SRAM, etc.)) and nonvolatile memory elements. The memory typically comprises a native operating system, one or more native applications, emulation systems, or emulated applications for any of a variety of operating systems and/or emulated hardware platforms, emulated operating systems, etc. For example, the applications may include application specific software which may comprise some or all the components of the emulation circuitry 340. In accordance with such embodiments, the components are stored in memory and executed by the processing device 320.

One of ordinary skill in the art will appreciate that the memory 326 can, and typically will, comprise other components which have been omitted for purposes of brevity. Note that in the context of this disclosure, a non-transitory computer-readable medium stores one or more programs for use by or in connection with an instruction execution system, apparatus, or device.

Depending on the embodiment, different techniques may be used for providing emulated HID movement information for facilitating user interaction with the 3D content used to provide the VR environment. In particular, hardware emulation and/or software emulation techniques may be used. With respect to hardware emulation, movement information provided by HMD 310 to PC 350 may be provided in a format that is readily consumable by the PC (e.g., emulated HID movement information). For software emulation, movement information provided by HMD 310 to PC 350 may be provided as HMD movement information, which is converted to emulated HID movement information onboard the PC. In such an embodiment, emulation circuitry 340 may be resident on PC 350. An example embodiment using software emulation will be described in greater detail later.

Figure 4:
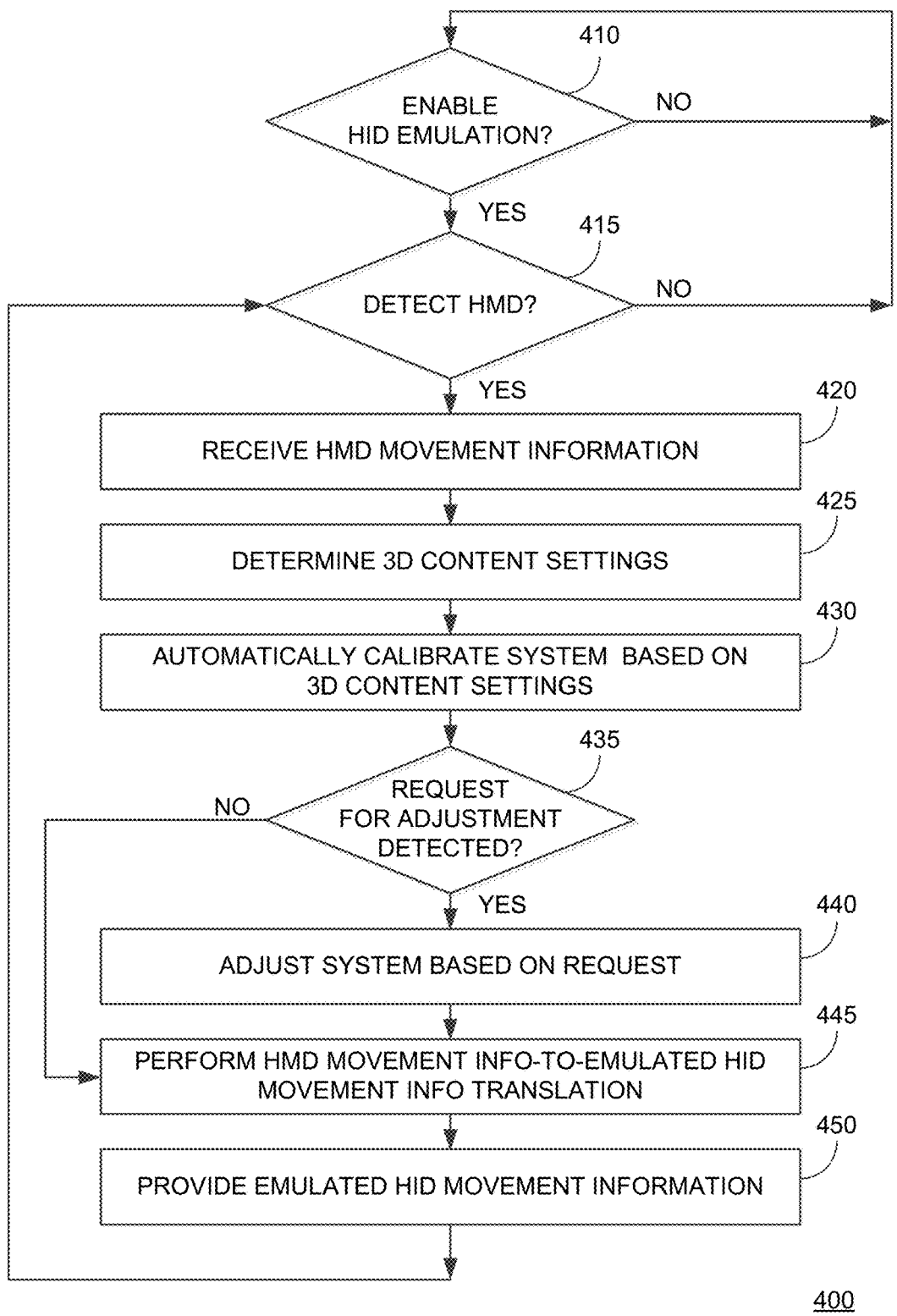
FIG. 4 is a flowchart of another example embodiment of a method.

FIG. 4 is a flowchart depicting another embodiment of a method (functionality) that may be associated with emulation circuitry (system) 340 of FIG. 3, for example. As shown in FIG. 4, the method (or process) 400 may be construed as beginning at block 410, in which a determination is made regarding whether HID emulation (e.g., emulation circuitry) is to be enabled. If enabled, the process may proceed to block 415 in which a determination is made as to whether an HMD is detected. In some embodiments, this may be accomplished by detecting the presence of HMD movement information. If an HMD is detected, the process may proceed to block 420, in which HMD movement information is received. Alternatively, if an HMD is not detected, the process may return to block 410.

After block 420, one or more settings associated with the 3D content are determined (block 425) and the associated system (e.g., a component of the VR system) is calibrated accordingly (block 430). By way of example, resolution settings of the system may be adjusted to accommodate an optimized display of the 3D content on the HMD. In some embodiments, default settings may be used. Thereafter, the process may proceed to block 435, in which a determination is made as to whether a request for adjustment is detected. In some embodiments, the adjustment may be associated with a system-level adjustment for adjusting a parameter (e.g., brightness) of the system. If such a request (which may be represented by an associated adjustment signal initiated by the user) is detected, the process may proceed to block 440, in which the system is adjusted accordingly. In some embodiments, the request may be initiated by user actuation of a component of the HMD or by gesture recognition, among others. If no such request is detected, the process may proceed to block 445, in which HMD movement information is translated into emulated HID movement information. Notably, the process may also proceed to block 445 after system adjustment is accomplished in block 440.

With respect to HMD movement information-to-emulated HID movement information translation, the HMD movement information received in block 420 is translated into emulated HID movement information in block 445. Then, as depicted in block 450, the emulated HID movement information is provided, such as to system HID event management, to facilitate interaction of the user within a VR environment associated with the 3D content that is displayed by the HMD. Thereafter, the process may return to block 415 and proceed as described before. So provided, the aforementioned functionality may facilitate interaction of a user with 3D content in a conventional manner (e.g., via the use of a mouse and/or keyboard while being displayed on the display of a PC) and/or with the use of an HMD depending on which inputs are present.

The functional aspects described above with respect to blocks 445 and 450 may be performed in different manners in various embodiments. An example of such a variation in which enhanced interaction with 3D content is accommodated is described with respect to the flow chart of FIG. 5 and the schematic diagrams of FIGS. 6A, 6B, 7A and 7B. In particular, in this embodiment, the 3D content is configured to respond to inputs provided by an HID, including HID pitch inputs and HID yaw inputs; however, the 3D content is not configured to respond to HID roll inputs.

Figure 5:
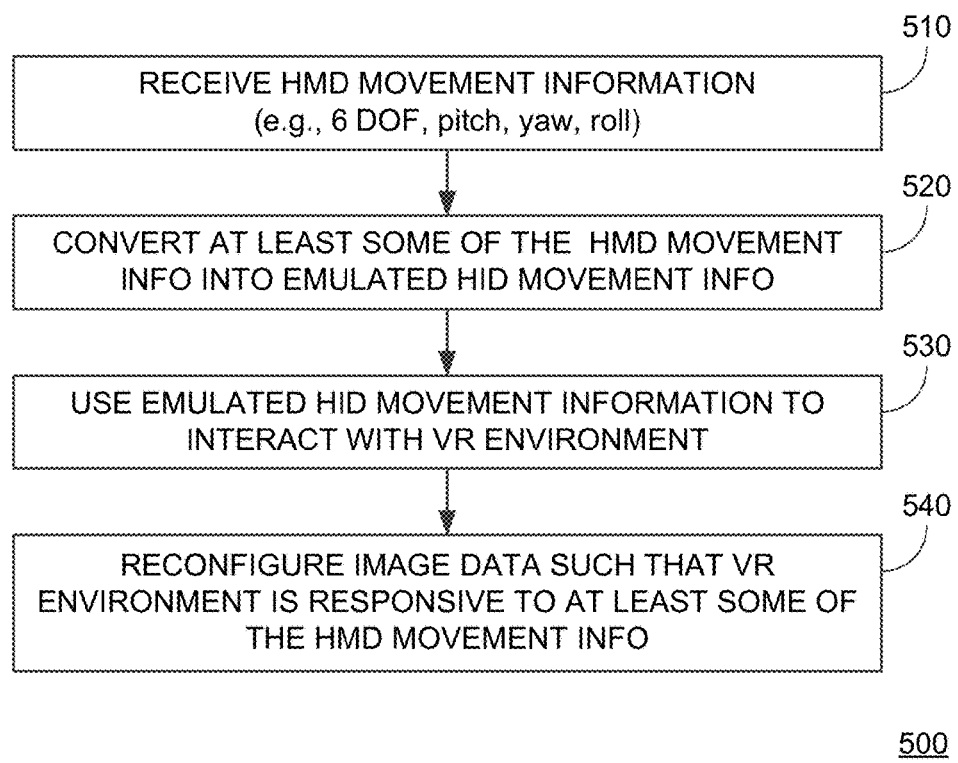
FIG. 5 is a flowchart of another example embodiment of a method.

As shown in FIG. 5, the method 500 may be construed as beginning at block 510, in which movement information corresponding to movement of a VR head mounted display (HMD) is received. Specifically, the HMD movement information includes HMD pitch information corresponding to pitch of the HMD, HMD yaw information corresponding to yaw of the HMD, and HMD roll information corresponding to roll of the HMD, as well as other information such as information corresponding to six degrees of freedom (6

DOF). In block 520, at least some of the HMD movement information is converted into emulated HID movement information adapted to serve as emulated HID inputs for interacting with the 3D content. By way of example, the HMD pitch information and the HMD yaw information are converted into emulated HID pitch inputs and emulated HID yaw inputs, respectively. Then, as shown in block 530, the emulated HID movement information is used to facilitate interaction of the user within a VR environment associated with the 3D content that is displayed by the HMD. As such, the VR environment responds to the emulated HID pitch inputs and the emulated HID yaw inputs.

In block 540, image data associated with the 3D content is reconfigured so that the VR environment responds to the HMD roll information. In some embodiments, this may involve translating displayed images corresponding to the image data in response to the HMD roll information. Recall that the 3D content as originally provided is not configured to respond to HID roll inputs; however, the image data reconfiguration permits such interaction. It should also be noted, however, that some provided information may be used for image data reconfiguration that may or may not relate to sensors, such as lens distortion correction, perspective correction, etc.

Figure 6A:
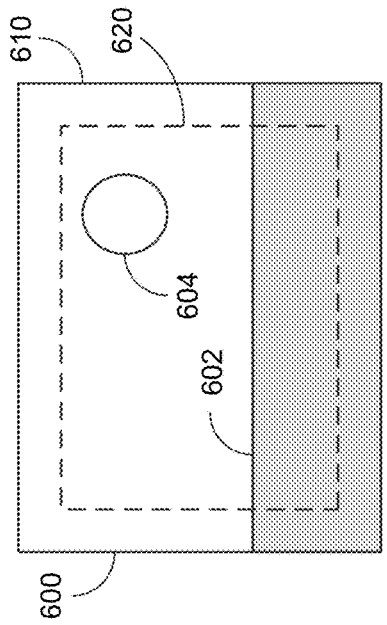
FIGS. 6A, 6B, 7A, and 7B schematic diagrams depicting representative images that may be provided by another example embodiment.

As shown in FIG. 6A, an example of image data associated with 3D content and a corresponding displayed image are presented. In particular, displayed image 600 includes a horizon 602 and a sphere 604. The image data forming image 600 is depicted in the frame 610, with the displayable portion of the image data being represented by the frame 620 (depicted in dashed lines), which also may correspond to a frame buffer. Note the position of horizon 602 and sphere 604 relative to frame 620.

Figure 6B:
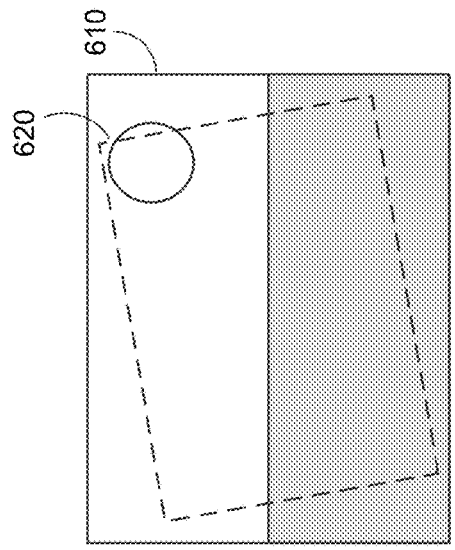

FIG. 6B depicts the image data and displayed image after responding to user inputs. Specifically, the inputs (which may be HID inputs or emulated HID inputs) have resulted in the displayed image appearing to move with respect to pitch and yaw. Notably, horizon 602 and sphere 604 have translated upward (representative of a down-pitch movement) and to the right (representative of a left-yaw movement) within frame 620. With some 3D content, that which is shown in FIGS. 6A and 6B may be representative of the extent of interaction typically available.

Figure 7A:
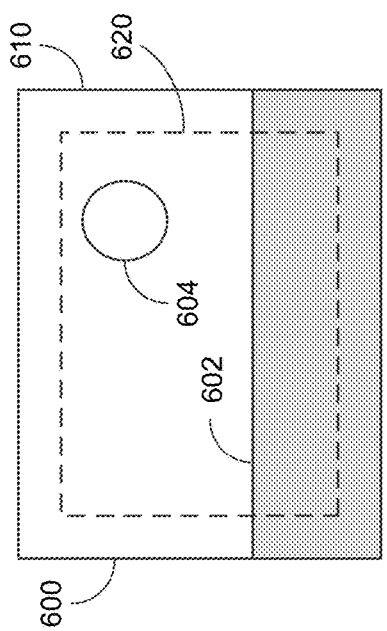
Figure 7B:
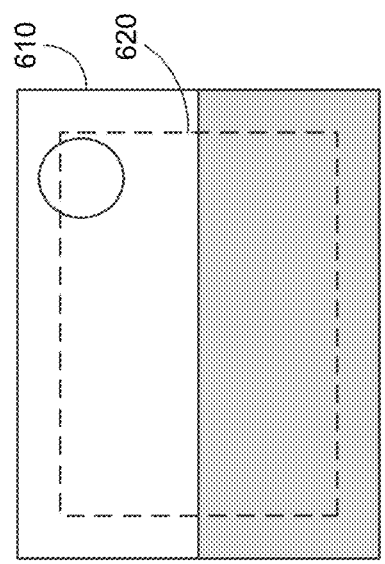

However, as depicted in FIGS. 7A and 7B, enhanced interaction with 3D content may be provided. In particular, in comparing the positions of horizon 602 and sphere 604 in FIGS. 7A and 7B, it is shown that the positions have been translated upward (representative of a down-pitch movement), to the right (representative of a left-yaw movement), and clockwise (representative of left-roll movement) within frame 620. This may be accomplished in some embodiments by reconfiguring the image data to a resolution that accommodates a desired orientation of the frame that is to be displayed (e.g., by altering the image data set for filling the frame buffer). Thus, even though the 3D content may not have been adapted for roll response (or any other movement), roll movement inputs provided by an HMD may be used for enhancing user interaction with that 3D content.

Figure 8:
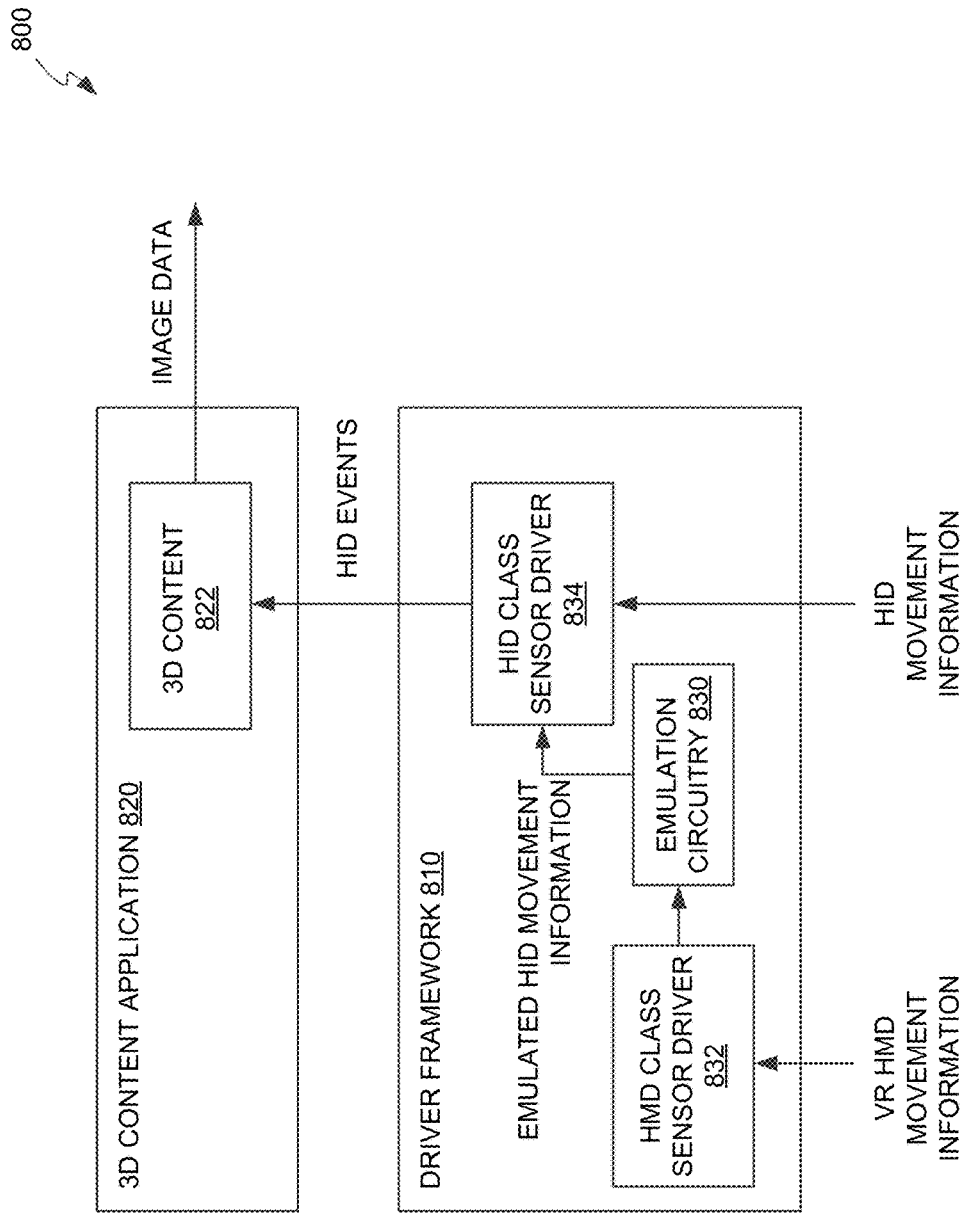
FIG. 8 is a schematic diagram of another example embodiment of a VR system.

As mentioned above, different types of emulation may be used for providing the functionality associated with various embodiments. In this regard, FIG. 8 depicts another embodiment of a VR system that uses software emulation techniques. As shown in FIG. 8, VR system 800, which may be implemented on a personal computer in coordination with various input devices (e.g., an HMD and one or more HIDs) includes a driver framework 810 that is adapted to interact with a 3D content application 820 (e.g., OPENGL® 3D or MICROSOFT® DIRECT3D®) and associated 3D content 822. Driver framework 810 incorporates emulation circuitry 830, an HMD class sensor driver 832, and an HID class sensor driver 834. In operation, each of the class sensor drivers 832, 834 is enabled to receive movement information from one or more corresponding input sensors/devices. For instance, HMD class sensor driver 832 may receive HMD movement information from an associated HMD (not shown in FIG. 8), and HID class sensor driver 834 may receive HID movement information from an associated HID (also not shown). In contrast to HID movement information, which may be handled directly by driver 834, HMD movement information provided to HMD class sensor driver 832 is provided to emulation circuitry 830 so that the emulation circuitry may output emulated HID movement information for use by driver 834. Thereafter, driver 834 provides HID events for interacting with 3D content 822 based on the emulated HID movement information and/or HID movement information provided.

Various functions, functional components and/or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

What is claimed is:

1. A virtual reality (VR) system for displaying three-dimensional (3D) content to a user, the 3D content being configured to respond to inputs provided by a human interface device (HID), the system comprising:
   a VR head mounted display (HMD) having a head piece and a display, the head piece being configured to be worn by a user to position the display, the display being configured to display the 3D content to the user, the head mounted display being configured to provide movement information corresponding to movement of the head mounted display; and
   emulation circuitry configured to:
   receive the movement information;
   convert the movement information into emulated HID movement information compatible with the 3D content; and
   use the emulated HID movement information to facilitate interaction of the user within a VR environment, associated with the 3D content, displayed on the display of the head mounted display;
   wherein:
   the 3D content is configured to respond to HID pitch inputs and HID yaw inputs, but not configured to respond to HID roll inputs;
   the movement information comprises HMD pitch information, HMD roll information, and HMD yaw information; and
   the emulation circuitry is further configured to:

convert the HMD pitch information and the HMD yaw information into emulated HID pitch inputs and emulated HID yaw inputs, respectively;

use the emulated HID pitch inputs and emulated HID yaw inputs to facilitate interaction of the user within the VR environment displayed by the head mounted display such that the VR environment responds to the emulated HID pitch inputs and the emulated HID yaw inputs; and reconfigure image data associated with the 3D content such that the VR environment responds to the HMD roll information.

2. The system of claim 1, wherein the emulated HID movement information and HID movement information from an HID are used to facilitate the interaction of the user with the 3D content displayed on the HMD.

3. The system of claim 2, wherein:

the system further comprises a personal computer having a display and an HID, the display being configured to display the 3D content, the HID being configured to provide HID movement information to facilitate interaction of the user with the 3D content displayed on the display of the personal computer; and the emulation circuitry is configured to default, in response to detection of the HID movement information, to use of the HID movement information for interacting with the 3D content.

4. The system of claim 3, wherein the emulation circuitry is resident on the personal computer.

5. The system of claim 1, wherein the emulation circuitry is carried by the head mounted display.

6. The system of claim 1, wherein the 3D content is based on OPENGL® 3D or MICROSOFT® DIRECT3D® 3D platform.

7. The system of claim 1, wherein the emulation circuitry is further configured to determine settings associated with the 3D content and automatically calibrate the system accordingly.

8. The system of claim 1, wherein the emulation circuitry is further configured to receive an adjustment signal corresponding to a system-level adjustment and to adjust a parameter of the system in response thereto.

9. The system of claim 8, wherein the head mounted display is configured to detect a user input corresponding to a request for the system-level adjustment and to provide the adjustment signal.

10. A virtual reality (VR) method for displaying three-dimensional (3D) content to a user, the 3D content being configured to respond to inputs provided by a human interface device (HID), the method comprising:

receiving movement information corresponding to movement of a VR head mounted display;

converting the movement information into emulated HID movement information compatible with the 3D content;

using the emulated HID movement information to facilitate interaction of the user within a VR environment, associated with the 3D content, displayed by the head mounted display;

converting the HMD pitch information and the HMD yaw information into emulated HID pitch inputs and emulated HID yaw inputs, respectively;

using the emulated HID pitch inputs and emulated HID yaw inputs to facilitate interaction of the user within the VR environment displayed by the head mounted display such that the VR environment responds to the emulated HID pitch inputs and the emulated HID yaw inputs; and reconfiguring image data associated with the 3D content such that the VR environment responds to the HMD roll information;

wherein:

the 3D content is configured to respond to HID pitch inputs and HID yaw inputs, but not configured to respond to HID roll inputs; and the movement information comprises HMD pitch information, HMD roll information, and HMD yaw information.

11. The method of claim 10, further comprising using HID movement information provided by an HID, instead of the emulated HID movement information, to control the 3D content such that the VR environment responds to the HID movement information.

12. The method of claim 10, further comprising automatically adjusting system settings according to settings associated with the 3D content.

13. A virtual reality (VR) system for displaying three-dimensional (3D) content to a user, the 3D content being configured to respond to inputs provided by a human interface device (HID), including HID pitch inputs and HID yaw inputs, but not configured to respond to HID roll inputs, the system comprising:

a VR head mounted display (HMD) configured to provide movement information corresponding to movement of the HMD, the movement information including HMD pitch information corresponding to pitch of the HMD, HMD yaw information corresponding to yaw of the HMD, and HMD roll information corresponding to roll of the HMD; and emulation circuitry configured to:

receive the movement information;

convert the movement information into emulated HID movement information compatible with the 3D content such that the HMD pitch information and the HMD yaw information are converted to emulated HID pitch inputs and emulated HID yaw inputs, respectively;

use the emulated HID movement information to facilitate interaction of the user within a VR environment, associated with the 3D content, displayed by the HMD such that the VR environment responds to the emulated HID pitch inputs and the emulated HID yaw inputs; and reconfigure image data associated with the 3D content such that the VR environment responds to the HMD roll information.

14. The system of claim 13, wherein:

the system further comprises a frame buffer configured to store the image data corresponding to a frame of the VR environment to be displayed; and the emulation circuitry, in reconfiguring the image data, is further configured to display less than all of the image data provided to the frame buffer for a frame of the image data to be displayed such that the image data to be displayed is spatially translatable in response to the HMD roll information.

15. The system of claim 13, wherein the emulation circuitry is further configured to receive an adjustment signal corresponding to a system-level adjustment and to adjust a parameter of the system in response thereto.

16. The system of claim 15, wherein the HMD is configured to detect a user input corresponding to a request for the system-level adjustment and to provide the adjustment signal.

17. The system of claim 13, wherein:
the system further comprises a personal computer having a display and an HID, the display being configured to display the 3D content, the HID being configured to provide HID movement information including HID pitch inputs and HID yaw inputs to facilitate interaction of the user with the 3D content displayed on the display of the personal computer; and
the emulation circuitry is further configured to:
use HID pitch inputs, if provided, instead of emulated HID pitch inputs and HID yaw inputs, if provided, instead of emulated yaw inputs to facilitate the interaction of the user with the 3D content.

18. A virtual reality (VR) method for displaying three-dimensional (3D) content to a user, the 3D content being configured to respond to inputs provided by a human interface device (HID), including HID pitch inputs and HID yaw inputs, but not configured to respond to HID roll inputs, the method comprising:
receiving movement information corresponding to movement of a VR head mounted display (HMD), the movement information including HMD pitch information corresponding to pitch of the HMD, HMD yaw information corresponding to yaw of the HMD, and HMD roll information corresponding to roll of the HMD;
converting the HMD pitch information and the HMD yaw information into emulated HID pitch inputs and emulated HID yaw inputs, respectively;
using the emulated HID pitch inputs and emulated HID yaw inputs to facilitate interaction of the user within a VR environment, associated with the 3D content, displayed by the HMD such that the VR environment responds to the emulated HID pitch inputs and the emulated HID yaw inputs; and
reconfiguring image data associated with the 3D content such that the VR environment responds to the HMD roll information.

19. The method of claim 18, wherein reconfiguring further comprises spatially translating displayed images corresponding to the image data in response to the HMD roll information.

* * * * *